United States Patent
Najafi Shoushtari et al.

(10) Patent No.: US 9,626,590 B2
(45) Date of Patent: Apr. 18, 2017

(54) FAST COST AGGREGATION FOR DENSE STEREO MATCHING

(71) Applicant: QUALCOMM Incorporated, San Diego, CA (US)

(72) Inventors: Seyed Hesameddin Najafi Shoushtari, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/858,907

(22) Filed: Sep. 18, 2015

(65) Prior Publication Data

US 2017/0083787 A1   Mar. 23, 2017

(51) Int. Cl.
*H04N 13/02* (2006.01)
*G06K 9/62* (2006.01)
(Continued)

(52) U.S. Cl.
CPC ......... *G06K 9/6201* (2013.01); *G06K 9/4661* (2013.01); *G06K 9/52* (2013.01);
(Continued)

(58) Field of Classification Search
CPC ...... G06K 9/6201; G06K 9/4661; G06K 9/52; H04N 13/00–13/0296; G06T 7/593; G06T 7/596
See application file for complete search history.

(56) References Cited

U.S. PATENT DOCUMENTS 9,538,157 B2 * 1/2017 Piestun .............. H04N 13/0203
2011/0249866 A1 * 10/2011 Piestun ................. G06T 7/0048
382/103

(Continued)

FOREIGN PATENT DOCUMENTS

EP       2466902 A2    6/2012
FI  GB 2523149 A  *  8/2015 ........... G06T 7/0075

OTHER PUBLICATIONS

"Chapter 6 : Image Matching Algorithms ED—Cyganek Boguslaw; Siebert J Paul," Jan. 1, 2008 (Jan. 1, 2008), An Introduction to 3d Computer Vision Techniques and Algorithms, Wiley, pp. 193-322, XP002698135, ISBN: 978-0-470-01704-3.

(Continued)

*Primary Examiner* — Sean Motsinger
(74) *Attorney, Agent, or Firm* — Kilpatrick Townsend & Stockton LLP (57) ABSTRACT

Methods, systems, computer-readable media, and apparatuses for fast cost aggregation for dense stereo matching are presented. One example method includes the steps of receiving first and second images of a scene; rectifying the images; computing a cost volume based on the first and second images; subsampling the cost volume to generate a subsampled cost volume; for each pixel, p, in the subsampled cost volume, determining one or more local extrema in the subsampled cost volume for each neighboring pixel, q, within a window centered on the pixel, p; for each pixel, p, performing cost aggregation using the one or more local extrema; performing cross checking to identify matching pixels; and responsive to identifying unmatched pixels, performing gap-filling for the unmatched pixels to generate a disparity map; and generate and storing a depth map from the disparity map.

20 Claims, 11 Drawing Sheets
(7 of 11 Drawing Sheet(s) Filed in Color)

(51) Int. Cl.
*G06K 9/52* (2006.01)
*G06K 9/46* (2006.01)
*H04N 13/00* (2006.01)

(52) U.S. Cl.
CPC ..... *H04N 13/0022* (2013.01); *H04N 13/0037* (2013.01); *H04N 2013/0077* (2013.01); *H04N 2013/0081* (2013.01)

(56) References Cited

U.S. PATENT DOCUMENTS

| | | | |
|---|---|---|---|
| 2012/0014590 A1 | 1/2012 | Martinez-Bauza et al. | |
| 2012/0163704 A1 | 6/2012 | Chang et al. | |
| 2013/0215234 A1 | 8/2013 | Lim et al. | |
| 2014/0112572 A1* | 4/2014 | Reif | G06K 9/6211 382/154 |
| 2014/0219549 A1 | 8/2014 | Choi et al. | |
| 2015/0170371 A1* | 6/2015 | Muninder | G06T 7/0075 382/154 |
| 2015/0279045 A1* | 10/2015 | Zhong | G06K 9/6212 382/154 |
| 2015/0302596 A1* | 10/2015 | Mizukami | G06T 7/0075 382/154 |
| 2015/0324659 A1* | 11/2015 | Liu | G06T 17/00 382/197 |
| 2015/0339824 A1* | 11/2015 | Uliyar | G06T 7/0055 348/46 |
| 2016/0037121 A1* | 2/2016 | Chang | G06T 7/0057 348/47 |
| 2016/0063719 A1* | 3/2016 | Ukil | G06T 5/006 382/103 |
| 2016/0261850 A1* | 9/2016 | Debevec | H04N 13/0242 |
| 2016/0284090 A1* | 9/2016 | Huang | H04N 13/0011 |

OTHER PUBLICATIONS

Einecke N, "Stereoscopic Depth Estimation for Online Vision Systems," Jan. 1, 2012 (Jan. 1, 2012), pp. i-xiii,1-161, XP055126942, Retrieved from the Internet: URL:http://d-nb.info/1031421920/34 [retrieved on Jul. 4, 2014].
International Search Report and Written Opinion—PCT/US2016/048155—ISA/EPO—Nov. 7, 2016.
Kelly P., et al., "Pedestrian Detection and Tracking using Stereo Vision Techniques," Mar. 1, 2008 (Mar. 1, 2008), XP055204011, Retrieved from the Internet: URL:http://doras.dcu.ie/109/4.2, 263 pages.
Scharstein D., et al., "A Taxonomy and Evaluation of Dense Two-frame Stereo Correspondence Algorithms," Stereo and Multi-Baseline Vision, 2001, (SMBV 2001), Proceedings, IEEE Workshop on Kauai, Hi, USA Dec. 9-10, 2001, vol. 47, No. 1/2/3, Apr. 1, 2002 (Apr. 1, 2002), pp. 7-42, XP055219892, US DOI: 10.1109/SMBV.2001.988771 ISBN: 978-0-7695-1327-0.
Ttofis C., et al., "A Hardware-Efficient Architecture for Accurate Real-Time Disparity Map Estimation," ACM Transactions on Embedded Computing Systems, ACM, New York, NY, US, vol. 14(2), Feb. 17, 2015 (Feb. 17, 2015), pp. 1-26, XP058064850, ISSN: 1539-9087, DOI: 10.1145/2629699.
Rother C., "Computer Vision I—Algorithms and Applications: Basics of Image Processing," Oct. 28, 2013, 74 pages.
Tan X., et al., "Soft Cost Aggregation with Multi-resolution Fusion," European Conference on Computer Vision, Springer International Publishing Switzerland, 2014, vol. 8893, pp. 17-32.

* cited by examiner

$$L'_p(d^*) = \sum_{q_s \epsilon B_s(p)} W_I(p, q'_S) L_{q_s}(d)$$

$q_S$: pixel position of $q$ at level $S$
$q'_S$: upsampled pixel position at level $S=1$

FAST COST AGGREGATION FOR DENSE STEREO MATCHING

FIELD

The present specification generally relates to computer vision and more specifically relates to fast cost aggregation for dense stereo matching.

BACKGROUND

Stereoscopic images of a scene may be used to provide a simulated three-dimensional view of the scene. Such images are typically simultaneously captured by two cameras with slightly different views into the scene, which can emulate the slightly different perspectives of a scene captured by a person's two eyes. In addition to providing simulated three-dimensional views of a scene, stereoscopic images may be used to obtain information about the depth of objects located within the scene. When stereoscopic images are captured by two cameras, the pixels in each of the two images generally correspond to the same objects within the scene, and in many cases, it is possible to correlate a pixel in one image with a pixel in the second image.

BRIEF SUMMARY

Examples of fast cost aggregation for dense stereo matching are described herein. For example, one example method includes the steps of receiving first and second images of a scene; rectifying the images; computing a cost volume based on the first and second images; subsampling the cost volume to generate a subsampled cost volume; for each pixel, p, in the subsampled cost volume, determining one or more local extrema in the subsampled cost volume for each neighboring pixel, q, within a window centered on the pixel, p; for each pixel, p, performing cost aggregation using the one or more local extrema; performing cross checking to identify matching pixels to generate a disparity map based on disparities between the matching pixels; responsive to identifying unmatched pixels, performing gap-filling for the unmatched pixels to update the disparity map; and generating and storing a depth map from the disparity map.

In another example, a system for fast cost aggregation for dense stereo matching is disclosed. The system includes a non-volatile computer-readable medium; and a processor in communication with the non-volatile computer-readable medium, the processor configured to: receive first and second images of a scene; rectify the images; compute a cost volume based on the first and second images; subsample the cost volume to generate a subsampled cost volume; for each pixel in the subsampled cost volume, determine one or more local extrema in the subsampled cost volume for each neighboring pixel, q, within a window centered on the pixel, p; for each pixel, p, perform cost aggregation using the one or more local extrema; perform cross to identify matching pixels to generate a disparity map based on disparities between the matching pixels; responsive to identifying unmatched pixels, perform gap-filling for the unmatched pixels to update the disparity map; and generate and store a depth map from the disparity map.

In another example, a computer-readable medium comprises program code for causing a processor to execute such a software application configured to cause the processor to receive first and second images of a scene; rectify the images; compute a cost volume based on the first and second images; subsample the cost volume to generate a subsampled cost volume; for each pixel in the subsampled cost volume, determine one or more local extrema in the subsampled cost volume for each neighboring pixel, q, within a window centered on the pixel, p; for each pixel, p, perform cost aggregation using the one or more local extrema; perform cross checking to identify matching pixels to generate a disparity map based on disparities between the matching pixels; responsive to identifying unmatched pixels, perform gap-filling for the unmatched pixels to update the disparity map; and generate and store a depth map from the disparity map.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and constitute a part of this specification, illustrate one or more certain examples and, together with the description of the example, serve to explain the principles and implementations of the certain examples.

DETAILED DESCRIPTION

Several illustrative examples will now be described with respect to the accompanying drawings, which form a part hereof. While particular examples, in which one or more aspects of the disclosure may be implemented, are described below, other examples may be used and various modifications may be made without departing from the scope of the disclosure or the spirit of the appended claims.

The following describes an illustrative system for fast cost aggregation for dense stereo matching. Two cameras are positioned with slightly different perspectives on the same scene and each takes a digital image of the scene at approximately the same time as the other camera. The system is configured to determine depth map information for the scene, including depths of objects within the scene, based on images captured by the cameras. For example, if the scene captured in the stereoscopic image includes two objects, one near to the cameras and one far away, it is likely that a pixel in the image from one camera, which represents part of the nearer object, will have a corresponding pixel in the image from the second camera that represents the same point on the same object. However, because the images are taken by cameras with different perspectives on the same scene, a pixel corresponding to a point on an object in the first image will usually differ from the position of a pixel corresponding to the same point on the object in the second image. By matching corresponding pixels in the two images and calculating the distance between these corresponding pixels, it is possible to determine the relative depths of objects within the scene. For example, as a general rule, the nearer an object is to the cameras, the greater the distance between corresponding pixels within the images.

Figure 1:
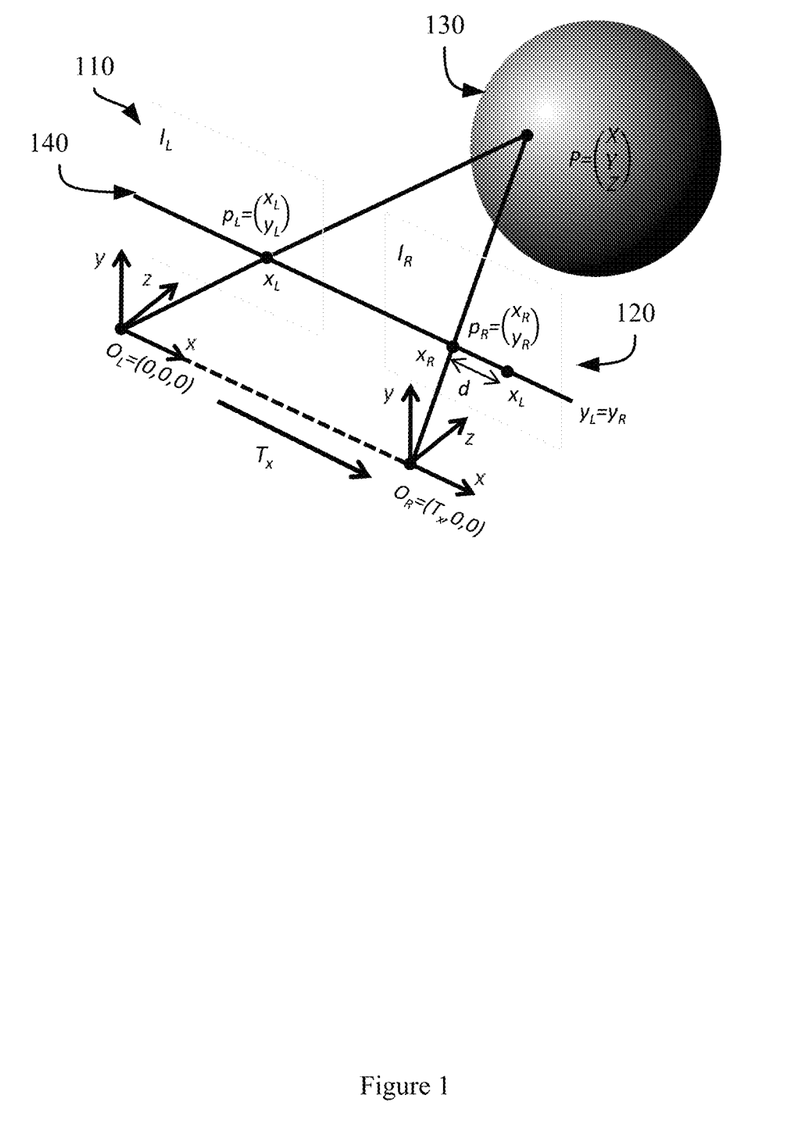
FIG. 1 shows an example camera configuration for capturing images of a scene.

For example, as may be seen in FIG. 1, two images 110, 120 of a single scene 130 are captured from different camera positions, marked as left and right "origin" points, $O_L$ and $O_R$, which are offset by a distance $T_x$. Because of the offset, $T_x$, the same point, P, appears at different pixel locations, $p_L$ and $p_R$, within the two images, $I_L$ and $I_R$. As can be seen, the x-axis coordinate, $x_R$, in the right image corresponding to point, P, is offset along the x-axis by discrepancy, d, where coordinate $x_L$ corresponds to the x-axis position of the point, P, in the left image. This discrepancy in pixel locations (also referred to as the disparity) may be used to determine an approximate distance from the cameras to the point on the object in the scene. And by knowing the stereo camera geometry and applying such an analysis to each point in the images, a depth map of the scene may be generated.

To generate the depth map, the illustrative system first obtains the images, $I_L$ (110) and $I_R$ (120), from the cameras and performs a rectification process on the images. The rectification process in this case attempts to align the images such that they are oriented so that the points along most (or all) horizontal scan lines through the first image are aligned with corresponding points along corresponding horizontal scan lines in the second image. For example, the illustrative system may rotate the first and second camera in three dimensions to align them such that the pixels along, e.g., a particular scan line in the first image correspond to the pixels along the same scan line in the second image, or may rotate the images to accomplish the same result.

Figure 2:
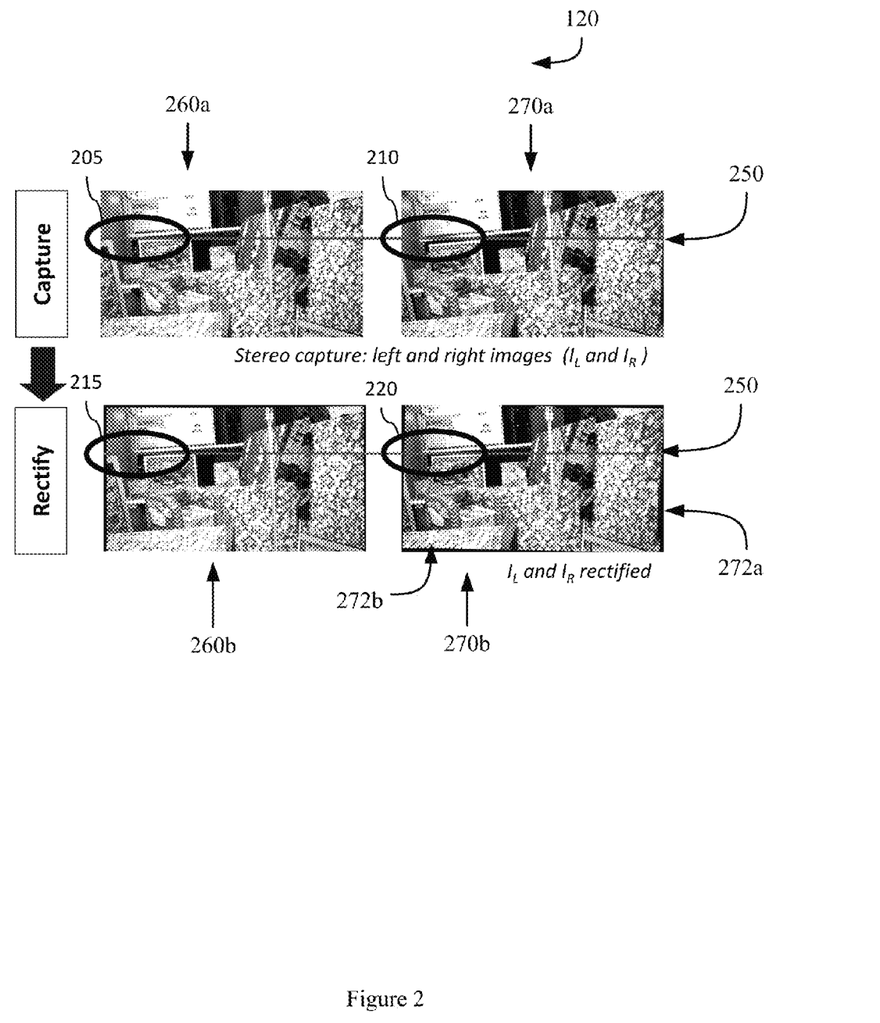
FIG. 2 shows example inputs and outputs of a rectification process.

FIG. 2 shows example inputs 260a, 270a and outputs 260b, 270b of a rectification process. As may be seen using the horizontal scan line 250, the initially-captured right image is not well-aligned with the left image, which misalignment is relatively easily appreciated within area 210 as compared with area 205. Thus, the system rectifies the left and right images, resulting in some loss of information around the edges of the images, represented by black pixels values at the edges of the two images, e.g., in regions 272a, 272b. However, as may be seen by comparing areas 215 and 220 along scan line 250, the images 260b, 270b now are aligned with each other.

Once the images, $I_L$ (260b) and $I_R$ (270b), have been rectified, the system generates a cost volume for the images. To generate the cost volume, the system calculates, for each pixel in one image, e.g., 260b, the likelihood, $L_p$(d), for every pixel p in the second image 270b along the same scan line that each of those pixels is shifted d pixels in the second image 270b (the likelihood is inversely proportional to the "cost" for matching the two pixels). For example, referring again to FIG. 1, for pixel $p_L$ of the left image, $I_L$, the system calculates the likelihood, $L_p$(d), for every pixel in the corresponding scan line in the right image, $I_R$ where the x-coordinate is smaller than the x-coordinate of $p_L$. Because this generates multiple values for each pixel in the left image, if this process is repeated for every pixel in the left image, it will generate a three-dimensional matrix of values that is referred to as the cost volume.

After generating the cost volume, the system subsamples the cost volume. Using the subsampled cost volume, the system determines, for each pixel, p, in the subsampled cost volume, local maxima disparity values for neighboring pixels, q, of pixel, p. After determining the local maxima for each pixel, p, the system performs cost aggregation using the local maxima. The system then performs cross-checking to match pixels in the two images, and for missing pixels in either image, performs gap-filling. The disparities between the matching pixels are then used to generate a disparity map. The system then may perform post-processing of the disparity map, such as smoothing, and then generates and stores depth map from the disparity map based on an inverse relationship between disparity values and a depth in the scene.

Such a depth map may be employed in a number of different embodiments. For example, a robot employing two cameras that may be used for navigation in an environment may employ an illustrative method, or other methods or systems according to this disclosure, to navigate within an environment, such as to avoid obstacles or to plan routes. Some examples of suitable robots may be fully autonomous, semi-autonomous, or fully user-controlled drones or other motorized vehicles. In some examples, a mobile device may be configured as a system according to this disclosure. For example, a mobile device may comprise one or more cameras that may be employed to capture images of a scene and to generate depth maps from those images. Such depth maps may be used to determine distances between objects in the scene, heights of objects, etc. In some examples, suitable systems or methods may operate in real-time or near-real time to provide information for use in navigation, range-finding, route planning, or relative positional information about the scene (e.g., distance between objects).

This illustrative example is provided to familiarize the reader with the concepts described herein and is not intended to be in any way limiting. Additional illustrative examples are provided below.

Figure 3:
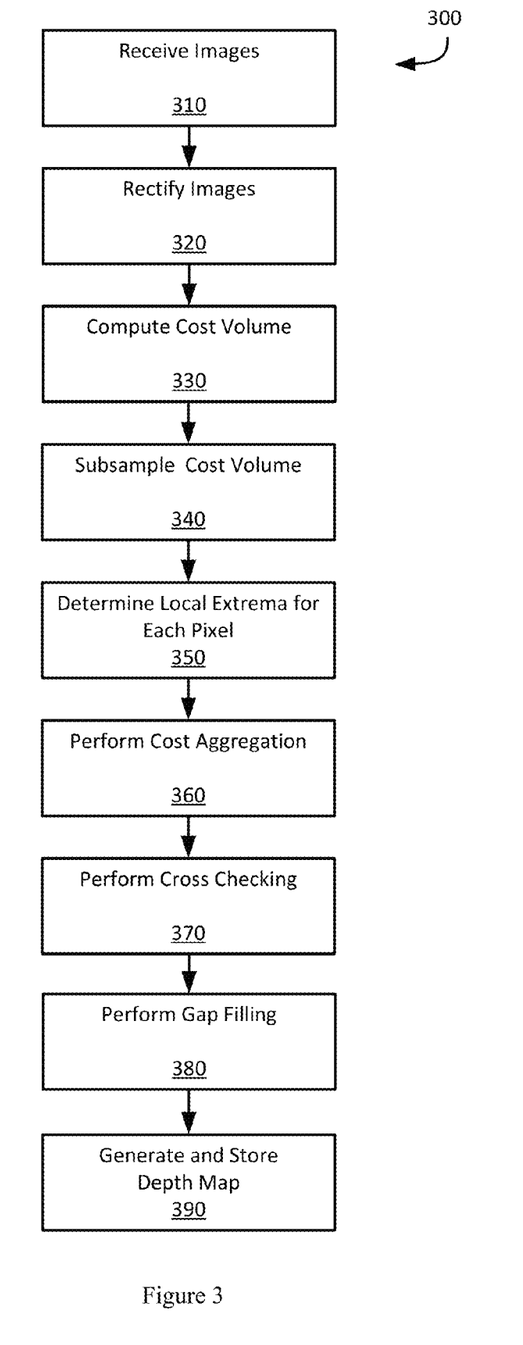
FIG. 3 shows an example method for fast cost aggregation for dense stereo matching.

Referring now to FIG. 3, FIG. 3 shows an example method 300 for fast cost aggregation for dense stereo matching. The method 300 in this example begins at block 310.

Figure 4:
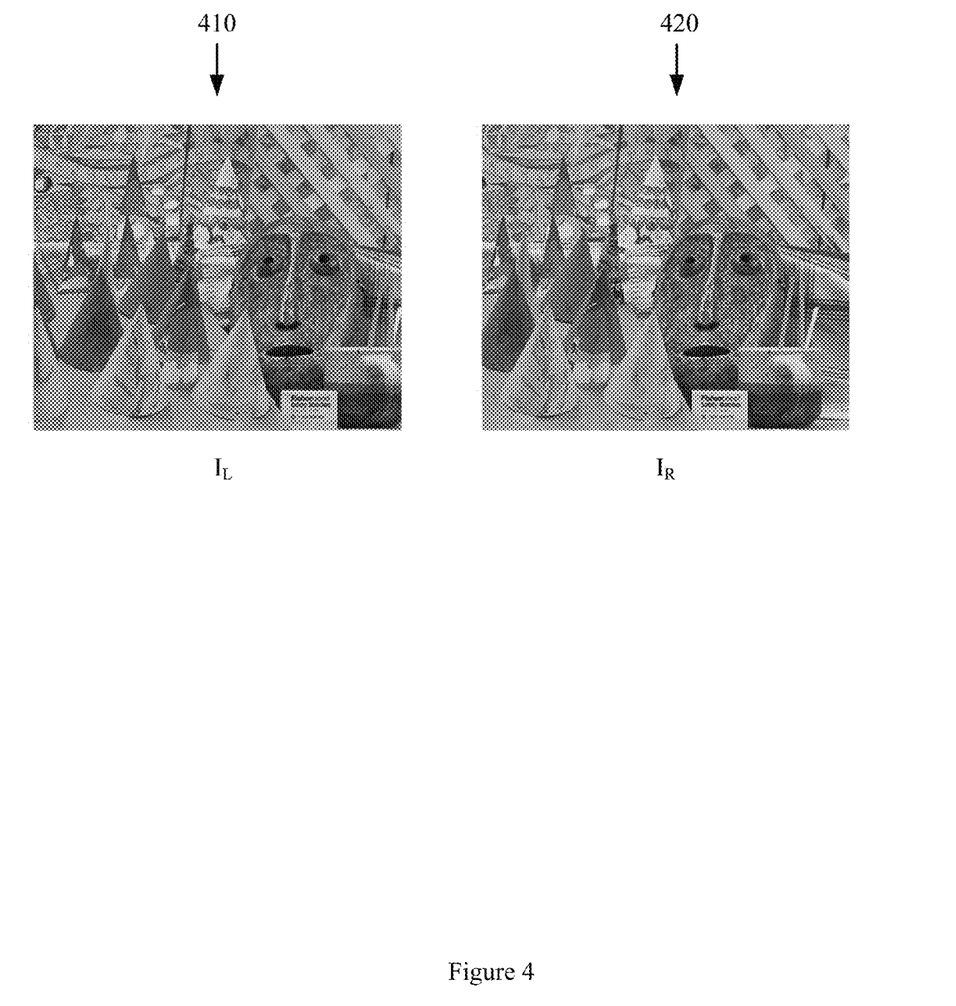
FIG. 4 shows example left and right images of a scene.

At block 310, a computing device, such as computing device 1000, receives two images of the same scene taken from different perspective points. In this example, the computing device 1000 is equipped with two cameras configured to capture stereoscopic images of a scene substantially simultaneously. However, in other examples, the images may be captured by the same camera at different times and from different positions, or the images may be stored on a computer-readable medium and are received when they are opened and read by the computing device 1000, or received from a remote device over a communications network. The two images used in this example will be referred to as "left" and "right" images (or "$I_L$" and "$I_R$"); however, these designations are only intended as illustrative labels for this stereoscopic example. The images may more generally be referred to as "first" and "second" images, though no particular capture sequence or importance of the respective images is implied by these labels. FIG. 4 shows example left and right images 410, 420 that will be used for illustrative purposes during the description of the example method of FIG. 3. As may be seen, the left and right reflect different images of the same scene, but are taken from different perspective points.

Once the computing device 1000 has received the left and right images 410, 420, the method 300 proceeds to block 320.

At block 320, the computing device 1000 rectifies the images 410, 420 such that they are substantially aligned with each other. After rectifying the images 410, 410, the method proceeds to block 330.

At block 330, the computing device 1000 computes a cost volume based on the left and right images 410, 420. To compute a cost volume in this example, the computing device 1000 steps through each pixel in the left image 410 and, for each pixel along the corresponding scan line in the right image 420, calculates the cost to match the pixel in the right image 420 with the pixel in the left image 410 (also referred to as the "likelihood"), referred to as $L_p(d)$. In this example, the computing device 1000 uses the following similarity function:

$$L_p(d) = \alpha \max(1 - \|I_L(p) - I_R(p-d)\|, 0) + (1-\alpha) \max(1 - |\nabla_x I_L(p) - \nabla_x I_R(p-d)|, 0),$$

where $\alpha$ is the weight of image intensity $I(p)$ versus gradient $\nabla_x I(p)$. However, in other aspects, other similarity functions may be employed, such as a more basic function like $L_p(d) = \|I_L(p) - I_R(p-d)\|$, or similarity functions that incorporate color channels.

Figure 5:
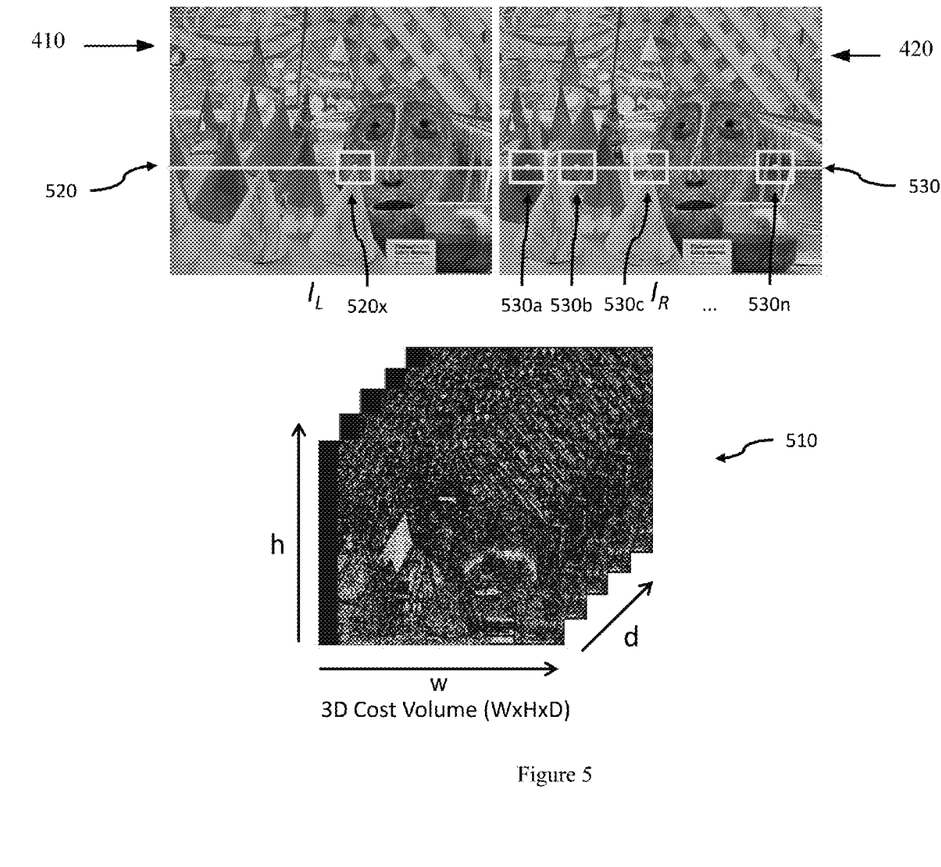
FIG. 5 shows an illustrative example of a part of a cost volume computation and a resulting cost volume.

Referring to FIG. 5, FIG. 5 shows an illustrative example of a part of a cost volume computation and a resulting cost volume 510. In this example, the computing device 1000 computes the cost values for the pixel 520x found on scan line 520 in the left image 410. A representation of a corresponding scan line 530 in the right image 420 is shown, and a subset of the pixels 530a-n on that scan line are represented for illustrative purposes. The boxes around the pixels are provided only for ease of identification of these pixels 520x, 530a-n by the reader. For each pixel to the left of 520x on the scan line 530 in the right image 420, e.g., pixels 530a-c in this example, a cost is calculated for the pixel in the left image 520x. However, because pixel 530n is to the right of pixel 520x, it will not be considered due to the rectification process.

To determine whether a pixel in the right image 420 is to the left or right of a pixel in the left image, a pixel in the left image, e.g., pixel 520x, is selected. The X coordinate of the pixel 520x is then hypothetically projected onto the scan line 530 in the right image 420. Assuming that X coordinates start from 0 at the left edge of the image and increase to the right, any pixel with an X coordinate value less than the X coordinate of the pixel 520x are to the left of the pixel 520x. Similarly, any pixel in the right image 420 with an X coordinate greater than the X coordinate of the pixel 520x are to the right of the pixel 520x. Selection of different coordinate systems may change relative pixel values, but the same underlying premise applies. A pixel in the left image is hypothetically mapped to its corresponding position in the right image (or vice versa), and a relative pixel location, e.g., whether the hypothetically-mapped pixel is to the left or right of a selected pixel in the right image, is then determined.

In some examples lacking rectified images, however, it may be necessary to consider pixels in one image on either side of a pixel in the other image. The cost represents a score for a pixel in one image based on the likelihood of it matching a pixel on the same scan line in the second image. For example, a cost may be determined, as described above, based on one or more attributes of the two potentially-matching pixels, such as color or intensity. If the pixel in the left image 410, e.g., pixel 520x, has a similar color to a pixel on the same scan line 530 in the right image 420, e.g., 530c, the cost value may be lower than for a pixel with a different color, e.g., pixel 530b.

As may be seen in FIG. 5, a cost volume is generated as a result of these computations. Each level of the cost volume represents a specific disparity range for the pair of images. Thus, for the upper left-most pixel in the cost volume, the value in the first level of the cost volume represents a disparity between the upper left-most pixel in the left image and a pixel along the corresponding scan line in the right image. The next level in the cost volume at that same pixel represents a disparity between the upper left-most pixel in the left pixel and a second pixel along the corresponding scan line in the right image. Thus each pixel at each level in the cost volume represents a disparity between a pixel in the first image and a pixel along a corresponding scan line in the second image.

In some examples, a second cost volume may be generated for the right image 420 as well, however, the two cost volumes would be inverses of each other as the costs to match the pixels between the right and left images 420, 410 does not change based on which image is analyzed. However, because computing and storing such a second cost volume may be resource-intensive, in some examples, cost values for pixels in the second image may be calculated as needed during a later step of cross-checking.

After the computing device 1000 calculates the cost volume, the method 300 proceeds to block 340.

At block 340, the computing device 1000 subsamples the cost volume to reduce the number of neighboring pixels for use in a matching window. In this example, the computing device 1000 subsamples the cost volume after smoothing it using a box filter. For example, to subsample a cost volume, the computing device 1000 may skip or eliminate every other pixel, or two out of three pixels, etc., in the cost volume; however, other methods for subsampling may be used in various examples.

In some examples, the computing device 1000 may subsample the cost volume more than once. For example, if the original cost volume of the left image 410 is referred to as $L_0$, the first subsampling results in subsampled volume $L_1$. $L_1$ may then be subsampled to produce subsampled volume $L_2$, and so forth. Successive subsampling may be advantageous in examples where the captured images have a significant number of pixels. For example, if the captured images are 320×200 pixels, a single subsampling of the cost volume may be sufficient based on the processing power, memory resources, or other capabilities of the computing device 1000. However, if the original images are 1920×1080, multiple rounds of subsampling may be desirable to obtain a cost volume having substantially less information than would be present if the cost volume was only subsampled once. It should be noted, however, that each round of subsampling results in a loss of information and thus a loss of precision, so the amount of subsampling to employ to reduce computation costs should be weighed against the desired output quality of the process.

After the computing device 1000 has subsampled the cost volume, the method proceeds to block 350.

Figure 6:
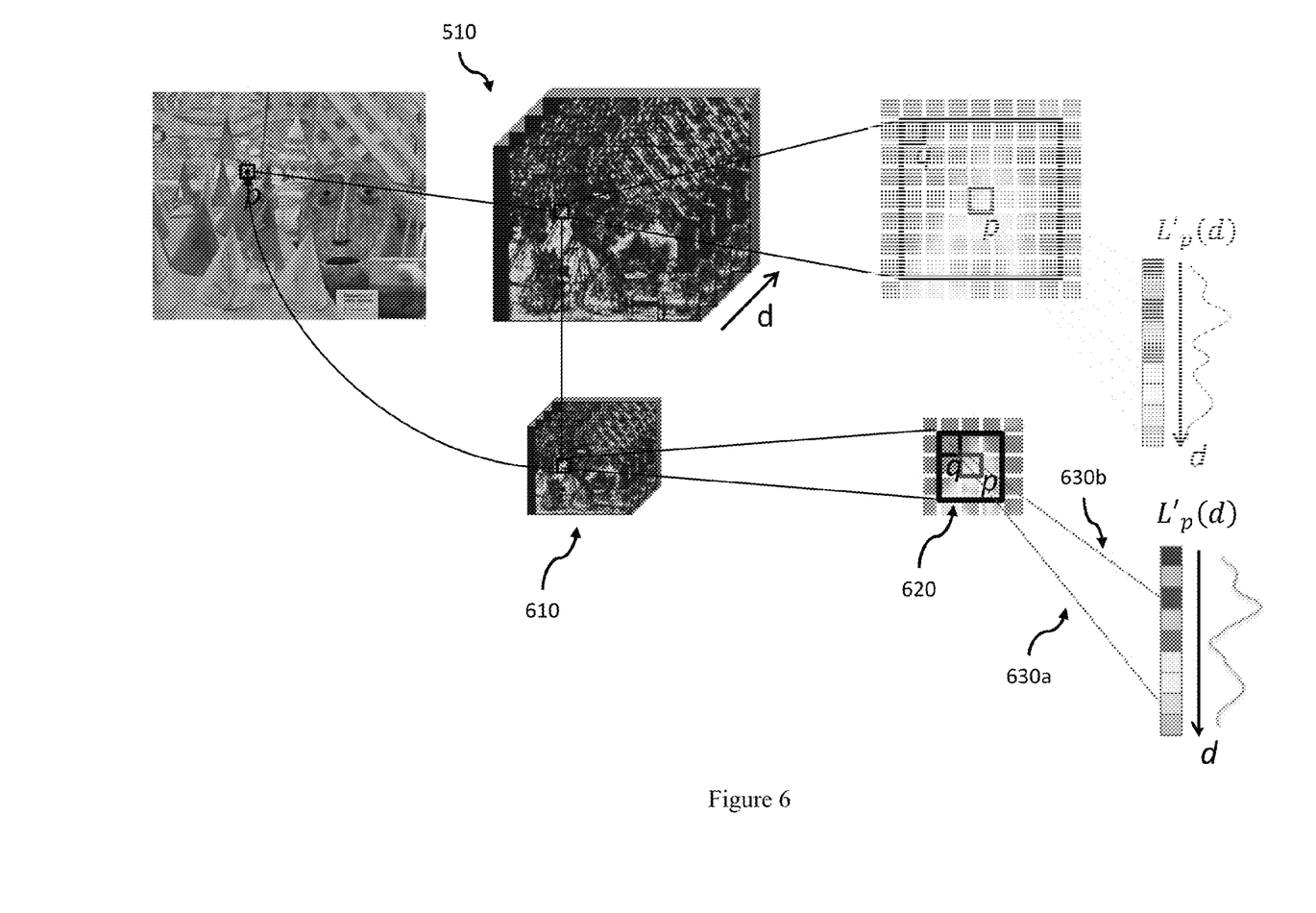
FIG. 6 shows an example illustration of subsampling the cost volume.

At block 350, the computing device 1000, for each pixel, p, in the subsampled cost volume, determines one or more local extrema, $D = \{d | L_p(d) > L_p(d+1) \text{ and } L_p(d) > L_p(d-1)\}$. Referring to FIG. 6, FIG. 6 shows an example illustration of determining one or more local extrema. As can be see, the cost volume 600 has been subsampled to generate a subsampled cost volume 610. In some examples, the computing device 1000 may compute only the global extremum value for each pixel, p, rather than (potentially multiple) local extrema values.

As can be seen in FIG. 6, the computing device 1000 has identified two local maxima 630$a$ and 630$b$ within the subsampled cost volume 510. A corresponding plot of the disparity values is shown and it can be seen that the identified local maxima have both been identified. The computing device 1000 then iterates through each pixel, p, and performs the same processing to identify local extrema (local maxima in this example).

After the computing device 1000 has determined the local extrema values, the method proceeds to block 360.

At block 360, the computing device 1000 performs cost aggregation for each pixel, p, using the local extrema to compute a weighted sum of cost values. To calculate the generate the weighted cost values in this example, the computing device 1000 computes a locally adaptive support weight for each pixel, p, and each neighboring pixel, q, within a small window. In this example, to calculate the weighted cost value for a pixel, p, the computing device 1000 computes the locally adaptive support weight, $W_I$, according to the following formula:

$$W_I(p, q) = e^{-\frac{\|I(p)-I(q)\|}{\sigma_I} - \frac{\|p-q\|}{\sigma_S}}$$

In this example, I indicates image intensities, $\sigma_I$ and $\sigma_S$ represent normalization parameters that allow for combining intensity values and pixel values used in the calculation above. The values for $\sigma_I$ and $\sigma_S$ may initially be set to candidate values and later be empirically refined based on the quality of output from the method 300 of FIG. 3. For example, the initial values for $\sigma_I$ may be set to a value from 1.6 to 1.7, and a value for $\sigma_S$ may be set to 15. As discussed above, while some examples use of intensities, some examples may also (or instead) employ colors.

After the computing device 1000 has computed the support weights, the computing device 1000 determines a weighted cost value for the pixel based on the locally adaptive support weights of the neighboring pixels. In this example, for each neighboring pixel, q, the computing device 1000 sums the products of the weighted cost value and the cost value to calculate the aggregated weighted cost, $L'_p(d^*)$, for pixel, p. In this example, the locally adaptive support weights are used to weight the cost values of neighboring pixels, q, according to the following formula:

$$L'_p(d^*) = \sum_{q_S \in B_S(p)} W_I(p, q'_S) L_{q_S}(d)$$

Figure 7:
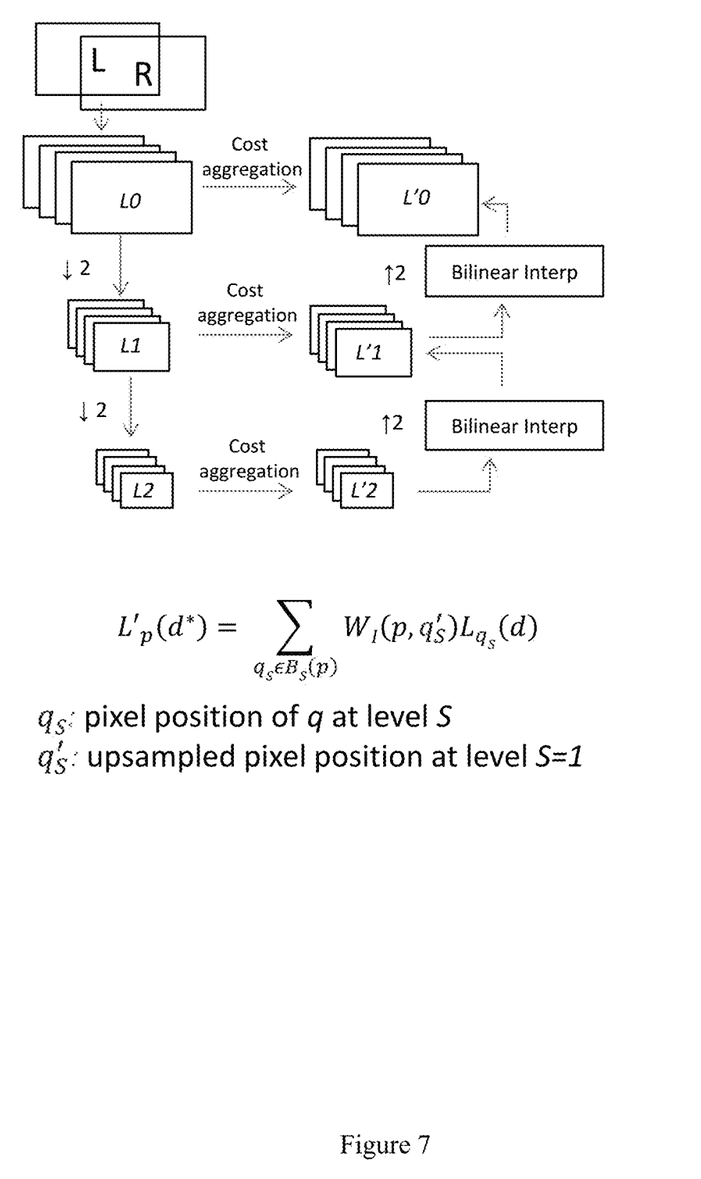
FIG. 7 shows example subsampled cost volumes L1 and L2 generated from the initial cost volume at L0.

In this example, because a subsampled cost volume is used, calculating the cost value, $L'_p(d)$, employs both pixel $q_S$ at level S and the upsampled pixel $q_S'$ at level S=0. This is illustrated in FIG. 7, and was discussed above, which shows example iteratively generated subsampled cost volumes $L_1$ and $L_2$ generated from the initial cost volume at $L_0$.

After the computing device 1000 has performed cost aggregation, the method proceeds to block 370.

At block 370, the computing device 1000 performs cross-checking to identify matching pixels. The computing device 1000 identifies, for each pixel in one image (corresponding to the calculated cost volume), the best matching pixel in the other image based on the weighted cost values. The computing device 1000 cross-checks the weighted cost values to determine whether each pixel in one image has a corresponding matching pixel in the other image. In many cases, a matching pixel is found; however, in some cases, no matching pixel is found. For example, a pixel in the left image may reside at a point on an object that is not visible from the perspective of the right image, or one of the images may be horizontally or vertically offset from the other. Once a pixel has been matched, a depth within the scene may be determined based on the disparity between the matching pixels. Thus, by matching the pixels in the images, a disparity map for the scene is generated, and from the disparity map, a depth map is later generated based on an inverse relationship of the disparities between matching pixels.

Figure 8:
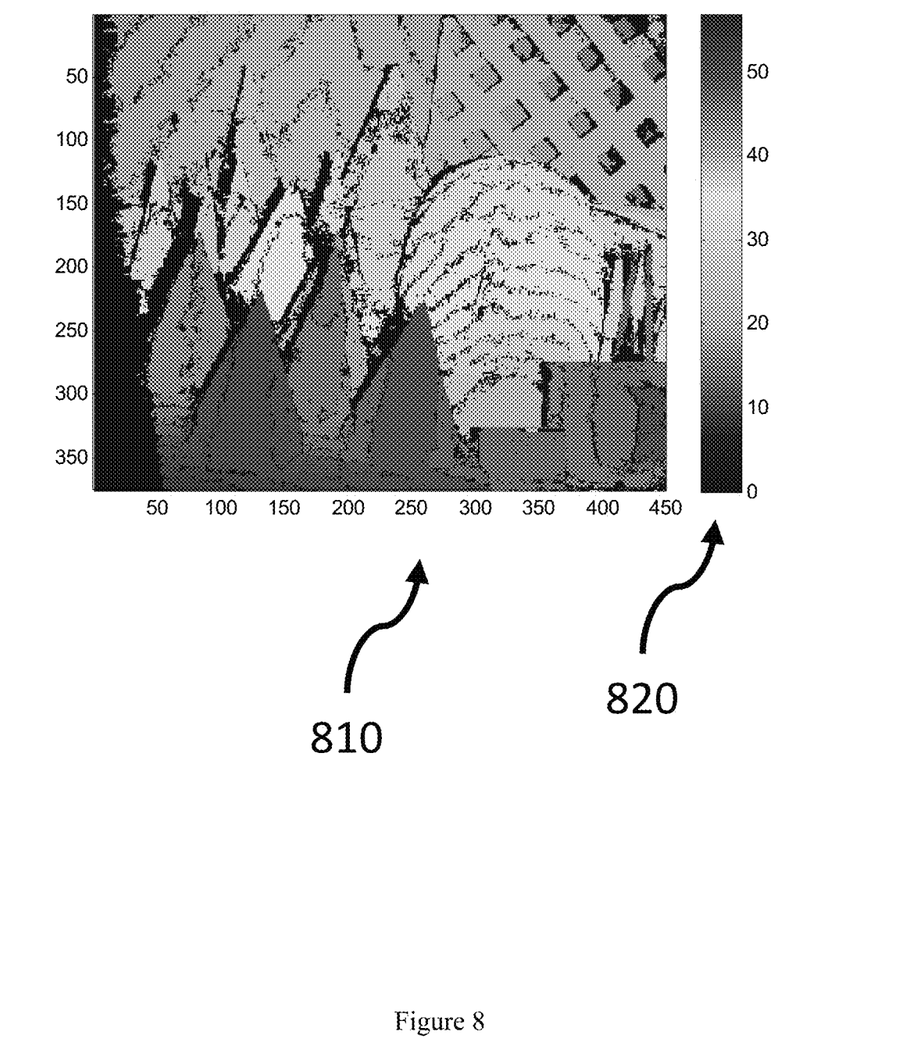
FIG. 8 shows an example visual representation of matching pixels identified in the left and right images, $I_L$ and $I_R$, shown in FIG. 4.

Referring to FIG. 8, FIG. 8 shows an example visual representation 810 of a disparity map of matching pixels identified in the left and right images, $I_L$ 410 and $I_R$ 420, shown in FIG. 4. FIG. 8 also includes a legend 820 that indicates a disparity corresponding to each matched pixel, and a color corresponding to no matching pixel having been found. For example, as may be seen in FIG. 4, the right image represents a portion of the scene that is offset to the right from the portion captured in the left image. As may be seen, the left image shows two and a half green cones in the foreground, while the right image only shows two. Thus, the left portion of the visual representation 810 includes a substantial number of unmatched pixels. Further, a number of pixels in the remainder of the visual representation indicate no matching pixels were found due to various effects, such as occlusion of parts of objects in the scene from different perspectives.

After the computing device 1000 performed cross-checking, the method proceeds to block 380.

Figure 9:
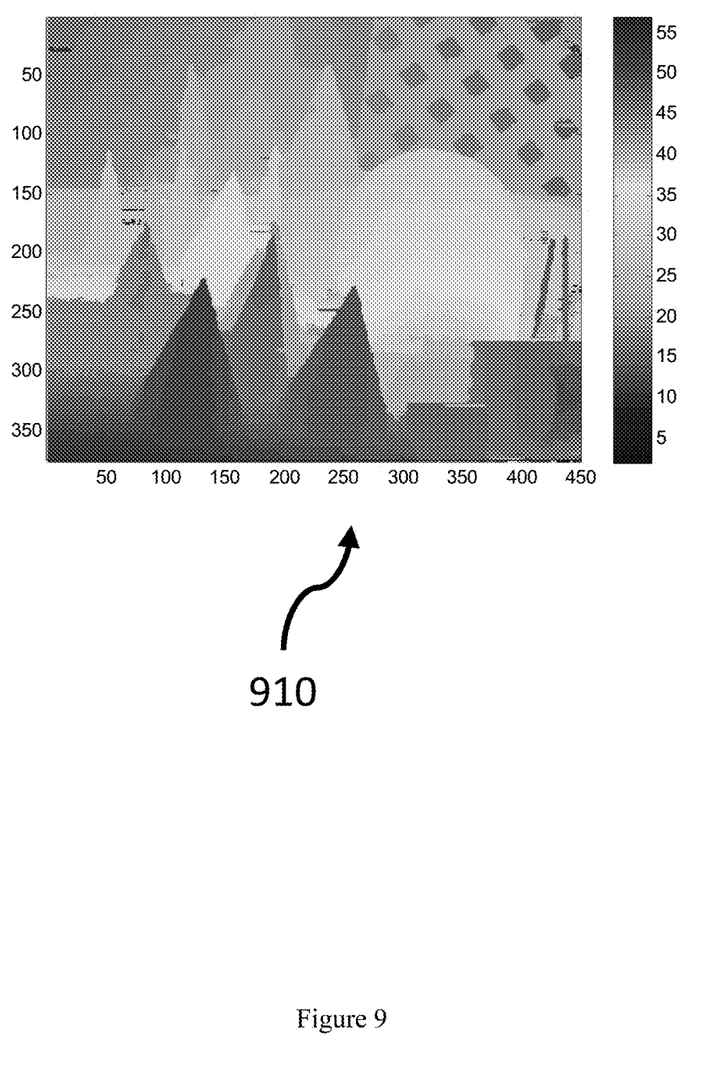
FIG. 9 shows an example visual representation of an interpolated and filtered depth map based on the depth map shown in FIG. 8.

At block 380, the computing device 1000, responsive to identifying unmatched pixels, performs gap-filling to generate a depth map. In this example, the computing device 1000 uses a threshold value to determine the gap-filling mechanism to be used for unmatched pixels in the image. If a number of consecutive unmatched pixels along a scan line is below the threshold, the computing device 1000 uses bilinear interpolation to determine values for the unmatched pixels. FIG. 9 shows an example after the gap-filling procedure. In other examples, however, other gap-filling techniques may be employed.

After completing block 380, the method proceeds to block 390, where the computing device 1000 generates and stores the depth map, such as on a computer readable medium or within a database, or it may display a graphical representation of the depth map. The depth map represents a depth in a scene at a particular pixel. Since disparities between matching pixels decrease with depth in the scene, the depth at a particular pixel may be determined based on the disparity value at that pixel in the disparity map. For example, a minimum disparity within the disparity map may be set to correspond to a depth of 1 meter, while a maximum disparity within the disparity map may be set at 10 meters, with depths of other pixels ranging from 1 to 10 meters based on the disparity at the respective pixel. In other examples, the ranges may be set to different values as appropriate.

While the example method 300 described above has been described as proceeding according to a particular sequence, in some aspects, the sequence of steps may occur in different orders, or multiple steps may occur simultaneously. Thus, no particular ordering of steps should be implied when reviewing FIG. 3 or the corresponding description of the example method 300 shown in FIG. 3. For example, as discussed above, such a method may be performed by one or more drones or motorized vehicles or by a user device, such as a mobile device.

Figure 10:
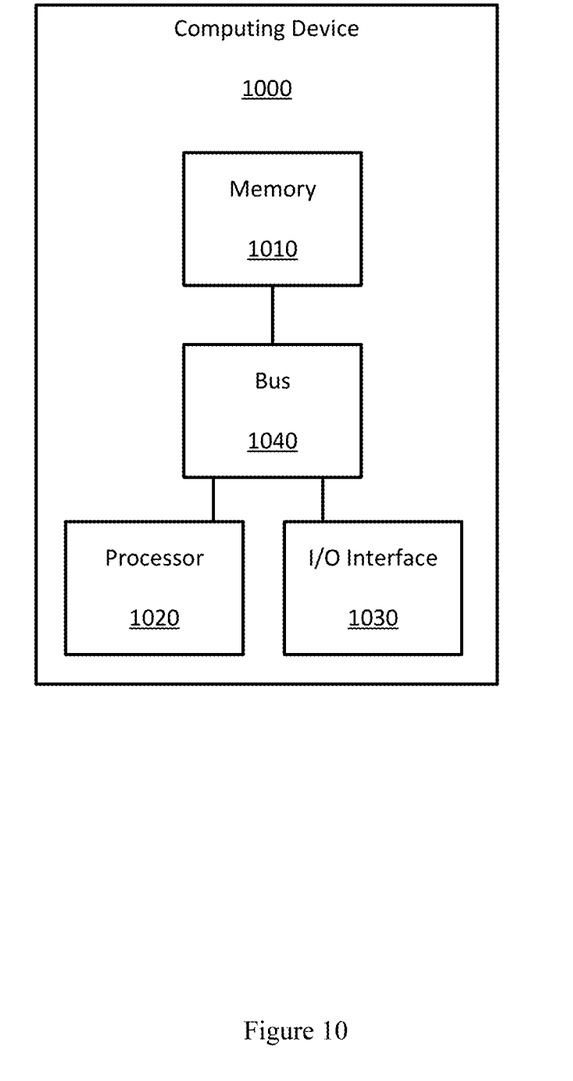
FIGS. 10-12 show example computing devices for fast cost aggregation for dense stereo matching.

Referring now to FIG. 10, FIG. 10 shows an example computing device 1000 for fast cost aggregation for dense stereo matching. Other suitable examples may of course be used. The computing device 1000 includes a processor 1020, a memory 1010, an input/output (I/O) interface 1030, and a bus 1040. The memory 1010 includes a tangible computer-readable memory on which program code is stored. A processor 1020 can execute program code stored in the memory 1010 by communicating via the bus 1040 to cause the computing device 1000 to perform one or more actions. For example, the computing device 1000 may be programmed to perform the example method 300 shown in FIG. 3 or other methods according to this disclosure. The computing device 1000 can include an input/output (I/O) interface 1030 for communication with other components. The computing device 1000 may be any device that can electronically process data and execute code that is a set of instructions to perform actions. Examples of the computing device 1000 include a robotic device, a cloud server, web server, desktop personal computer, laptop personal computer, handheld computing device, and mobile device.

In some aspects, the input/output (I/O) interface 1030 can be a transceiver for wireless communications. Examples of wireless communication provide for communication over a cellular network, Wi-Fi network, wireless local area network, and the like.

Figure 11:
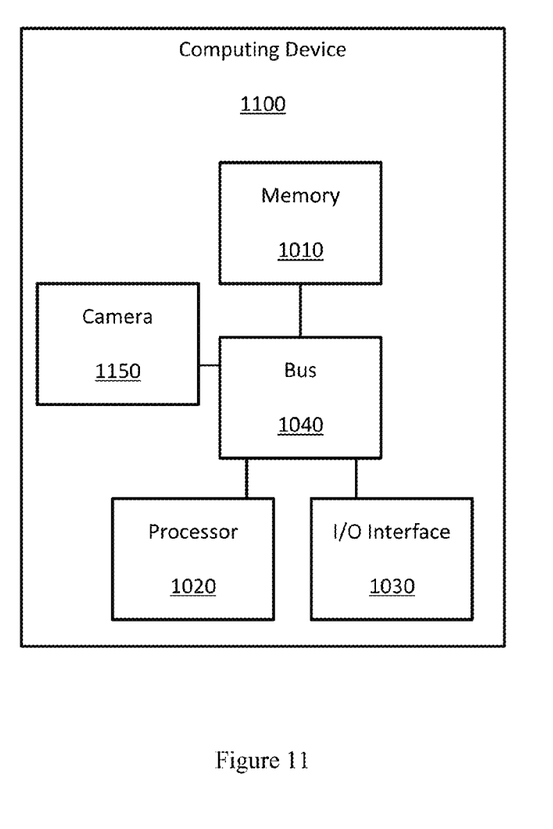
Figure 12:
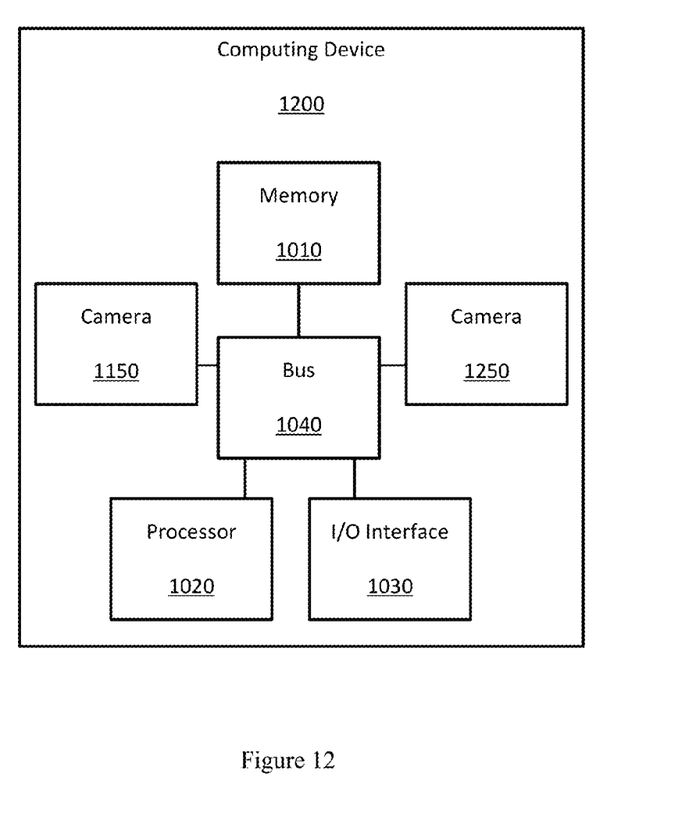

Referring now to FIG. 11, FIG. 11 shows an example computing device 1100 for fast cost aggregation for dense stereo matching. The computing device 1100 of FIG. 11 includes the components of the computing device 1000 of FIG. 10, but also includes a camera 1150, which is in communication with the processor and the memory via the bus, and is configured to capture one or more images. FIG. 12 shows a further example computing device 1200 for fast cost aggregation for dense stereo matching. In this example, the computing device 1200 includes two cameras in communication with the processor and the memory via the bus and configured to capture one or more sets of stereoscopic images of a scene.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

What is claimed is:

1. A method for fast cost aggregation for dense stereo matching comprising:
    receiving first and second images of a scene;
    rectifying the images;
    computing a cost volume based on the first and second images;
    subsampling the cost volume to generate a subsampled cost volume;
    for each pixel, p, in the subsampled cost volume, determining one or more local extrema in the subsampled cost volume for each neighboring pixel, q, within a window centered on the pixel, p;
    for each pixel, p, performing cost aggregation using the one or more local extrema;
    performing cross checking to identify matching pixels to generate a disparity map based on disparities between the matching pixels;
    responsive to identifying unmatched pixels, performing gap-filling for the unmatched pixels to update the disparity map; and
    generating and storing a depth map from the disparity map.

2. The method of claim 1, wherein determining one or more local extrema comprises determining one or more local maxima.

3. The method of claim 1, wherein determining one or more local extrema comprises determining a global extrema for pixel, p, in the subsampled cost volume.

4. The method of claim 1, wherein determining one or more local extrema comprises determining one or more local maxima within a matching window centered on the respective pixel, p, and wherein performing cost aggregation comprises determining a weighted cost value based on locally adaptive support weights of the neighboring pixels within the matching window.

5. The method of claim 4, wherein performing cost aggregation comprises determining a locally adaptive support weight, W(p, q), for the pixel, p, and a neighboring pixel, q, comprises calculating $$W(p, q) = e^{-\frac{\|I(p)-I(q)\|}{\sigma_I} - \frac{\|p-q\|}{\sigma_S}},$$

where I represents an image value and S is a level of the cost volume.

6. The method of claim 1, wherein subsampling the cost volume comprises subsampling the subsampled cost volume.

7. The method of claim 1, wherein performing cost aggregation is based on image intensities or image colors.

8. A device for fast cost aggregation for dense stereo matching comprising:
   a non-volatile computer-readable medium; and
   a processor in communication with the non-volatile computer-readable medium, the processor configured to:
      receive first and second images of a scene;
      rectify the images;
      compute a cost volume based on the first and second images;
      subsample the cost volume to generate a subsampled cost volume;
      for each pixel in the subsampled cost volume, determine one or more local extrema in the subsampled cost volume for each neighboring pixel, q, within a window centered on the pixel, p;
      for each pixel, p, perform cost aggregation using the one or more local extrema;
      perform cross to identify matching pixels to generate a disparity map based on disparities between the matching pixels;
      responsive to identifying unmatched pixels, perform gap-filling for the unmatched pixels to update the disparity map; and
      generate and store a depth map from the disparity map.

9. The device of claim 8, wherein the processor is further configured to determining one or more local maxima to determine the one or more local extrema.

10. The device of claim 8, wherein determining one or more local extrema comprises determining a global extrema for pixel, p, in the subsampled cost volume.

11. The device of claim 8, wherein the processor is further configured to determine one or more local maxima within a matching window centered on the respective pixel, p, to determine the one or more local extrema, and to determine a weighted cost value based on locally adaptive support weights of the neighboring pixels within the matching window to perform cost aggregation.

12. The device of claim 11, wherein the processor is further configured to determine a locally adaptive support weight, W(p, q), for the pixel, p, and a neighboring pixel, q, comprises calculating $$W(p, q) = e^{-\frac{\|I(p)-I(q)\|}{\sigma_I} - \frac{\|p-q\|}{\sigma_S}},$$

wherein I represents an image value and S is a level of the cost volume, to perform cost aggregation.

13. The device of claim 8, wherein the processor is further configured to subsample the subsampled cost volume.

14. The device of claim 8, wherein the processor is further configured to performing the cost aggregation based on image intensities or image colors.

15. A non-transitory computer-readable medium comprising program code to cause a processor to execute a software application for fast cost aggregation for dense stereo matching, the software application configured to:
   receive first and second images of a scene;
   rectify the images;
   compute a cost volume based on the first and second images;
   subsample the cost volume to generate a subsampled cost volume;
   for each pixel in the subsampled cost volume, determine one or more local extrema in the subsampled cost volume for each neighboring pixel, q, within a window centered on the pixel, p;
   for each pixel, p, perform cost aggregation using the one or more local extrema;
   perform cross checking to identify matching pixels to generate a disparity map based on disparities between the matching pixels;
   responsive to identifying unmatched pixels, perform gap-filling for the unmatched pixels to update the disparity map; and
   generate and store a depth map from the disparity map.

16. The non-transitory computer-readable medium of claim 15, wherein the software application is further configured to determining one or more local maxima to determine the one or more local extrema.

17. The non-transitory computer-readable medium of claim 15, wherein the software application is further configured to determine one or more local maxima within a matching window centered on the respective pixel, p, to determine the one or more local extrema, and to determine a weighted cost value based on locally adaptive support weights of the neighboring pixels within the matching window to perform cost aggregation.

18. The non-transitory computer-readable medium of claim 17, wherein the software application is further configured to determine a locally adaptive support weight, W(p, q), for the pixel, p, and a neighboring pixel, q, comprises calculating $$W(p, q) = e^{-\frac{\|I(p)-I(q)\|}{\sigma_I} - \frac{\|p-q\|}{\sigma_S}},$$

wherein I represents an image value and S is a level of the cost volume, to perform cost aggregation.

19. The non-transitory computer-readable medium of claim 15, wherein the software application is further configured to subsample the subsampled cost volume.

20. The non-transitory computer-readable medium of claim 15, wherein the software application is further configured to performing the cost aggregation based on image intensities or image colors.

* * * * *